United States Patent [19]

Slutzky et al.

[11] 4,041,463
[45] Aug. 9, 1977

[54] DOCUMENT FILING, UPDATING AND RETRIEVAL SYSTEM

[75] Inventors: Joel Slutzky, Placentia; LeeRoy W. Hausman, Jr., Fullerton, both of Calif.; Ronald F. Kostenbauer, Buffalo, Wyo.

[73] Assignee: Infodetics, Inc., Anaheim, Calif.

[21] Appl. No.: 651,472

[22] Filed: Jan. 22, 1976

[51] Int. Cl.² .............................................. G11B 27/02
[52] U.S. Cl. ...................................................... 364/900
[58] Field of Search ................ 340/172.5, 324; 445/1; 178/6.6 R

[56] References Cited
U.S. PATENT DOCUMENTS

| 3,501,746 | 3/1970 | Vosbury | 340/172.5 |
| 3,618,032 | 11/1971 | Goldsberry et al. | 340/172.5 |
| 3,653,001 | 3/1972 | Ninke | 340/172.5 |
| 3,654,611 | 4/1972 | Bluethman et al. | 340/172.5 |
| 3,701,972 | 10/1972 | Berkeley et al. | 340/172.5 |
| 3,810,109 | 5/1974 | Morris et al. | 340/172.5 |

*Primary Examiner*—Mark E. Nusbaum
*Attorney, Agent, or Firm*—Philip M. Hinderstein

[57] ABSTRACT

A system for filing, updating, and retrieving source documents comprising a video tape recorder; an electro-optic scanner for converting the images on source documents to video signals representative of such images; means for generating update signals representative of update information for source documents; a controller for selectively directing the video signals to first areas of defined storage locations in the video tape recorder and the update signals to second areas of the storage locations, the update signals for a particular source document being stored in the same storage location as the video signals therefor; a monitor for displaying source documents and update information, the controller selectively conducting the video signals stored in any storage location to the monitor; and means controlled by the controller for selectively mixing the update signals for the displayed source document with the video signals therefor for display therewith on the monitor.

12 Claims, 3 Drawing Figures

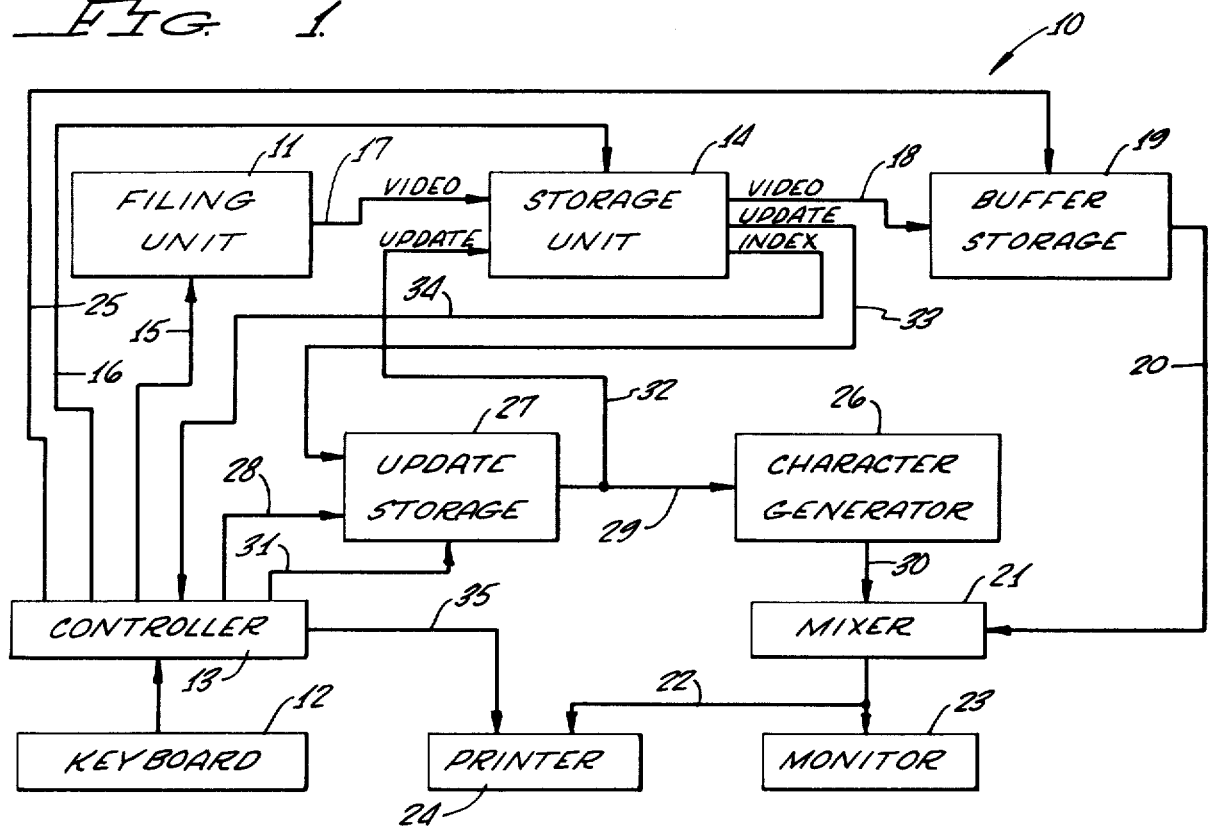
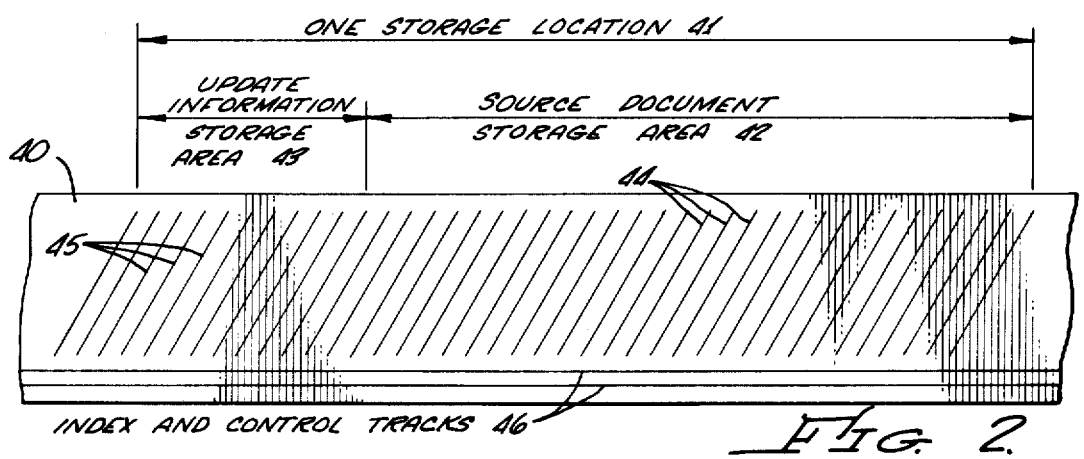
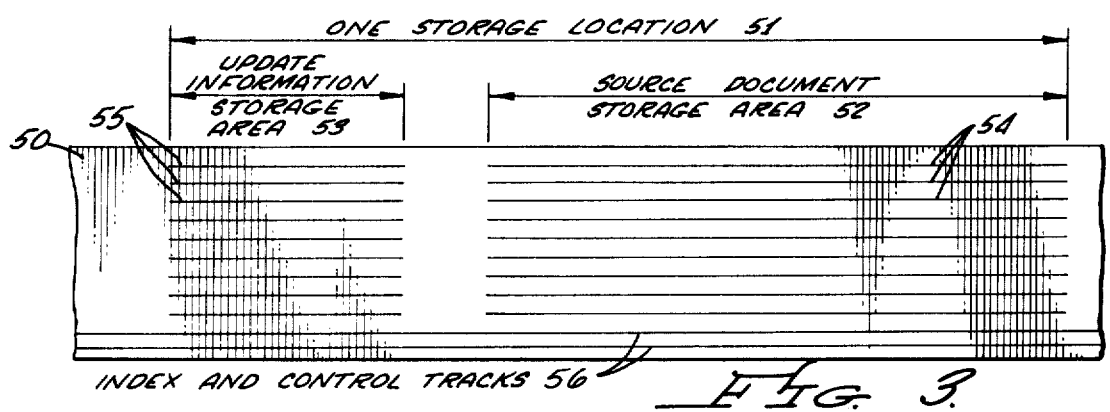

DOCUMENT FILING, UPDATING AND RETRIEVAL SYSTEM

BACKGROUND OF THE INVENTION

1. Field of the Invention

The present invention relates to a document filing, updating, and retrieval system and, more particularly, to a document storage and retrieval system where source documents are filed and then updated as part of an active record keeping system.

2. Description of the Prior Art

The documents numbers of documents which are generated in modern business activities, the large storage areas necessary for storage of such documents, the extent to which such documents are used, and the large number of individuals who commonly use the documents have created a monumental challenge for the field of document mangement. The traditional manual and semi-automatic methods of handling these large collections of documents have proven to be inefficient and costly. Typically, all documents are stored in their original state, requiring large storage areas therefor. Alternatively, it has been known to reduce stored documents using microfilm and this is a common solution to the problem.

A more recent solution that has been proposed for the record keeping problem is to use magnetic recording tape or other types of erasable storage medias to record, store, and reproduce electronic representations of source documents. A source documents is scanned using a conventional television-type camera and the resultant video signals are recorded at specified locations on a length of magnetic recording tape, which tape can be subsequently scanned for recalling the information. Examples of this latter type of system may be found in U.S. Pat. Nos. 3,352,968; 3,499,976; 3,514,537; 3,631,414; and 3,712,965. Examples of commercial systems are the Videofile information system of Ampex Corporation and the Trans-A-File automated filing and retrieval system of Trans-A-File Systems Company.

Still another major problem is the necessity for keeping documentation current and updated in an active file environment. Furthermore, while it is desirable to be able to keep documentation current and updated, it is also desirable not to lose the original or source document during updating. To make a commercially feasible system, the number of components must be minimized and the components themselves simplified to keep the total cost within realistic limits.

Heretofore, no available system solves all of the problems set forth above. In an image system, such as microfilm or pure video tape, a document must be refiled every time a change is made. This requires extra operations and is time-consuming and costly. In the case of film, it is necessary to reproduce the original document, make the changes, and then reprocess a new film. The multiple file documents which result present sorting difficulties and lead to an unwidely record keeping system.

In a data processing system where documents are converted to computer information, changes can be made to a base document, but at the penalty of losing the information content of the document as it was originally filed. Also, the nature of the computer conversion process precludes any cost-effective storage of the entire document, but rather requires the reduction and storage of only the desired information contained on the document. This is an unaccepatle approach in a variety of situations.

While some attempts have been made to electronically keep documentation current and updated in an active file environment (see, for example, U.S. Pat. No. 3,753,240 and the patents cited therein), such systems have typically used multiple medias, such as films and cumputers, to achieve a form of document update. However, the use of multiple storage medias is an expensive and complex solution to the problem and the source document, which is still stored on film, cannot be actively updated.

SUMMARY OF THE INVENTION

According to the present invention, there is provided a document filing, updating, and retrieval sysem which solves these problems in a manner unknown heretofore. With the present system, the source documents and the update information are stored on one storage media. The source document is stored on a fixed field format and the document update information is stored adjacent to it on another fixed field format, both fields occupying welldefined areas of the storage media. The two fixed field formats are adequate to completely define the original document as well as a completely updated document.

The source document may be stored in either analog or digital format and the document update information is stored in digital format. Upon subsequent display of the source document, the document update information is converted to an alpha-numeric overlay. This overlay may be supressed, at any time, to view the original document in it unaltered state. The entire source document can be covered with update information, thereby giving the present system virtually unlimited update capability. Furthermore, update information can be added to, altered, or erased without affecting the original document. The original document, too, can be updated to a new source document on an active basis. Because all operations are occurring on the document in question and in well-defined areas of the storage media, there is no additional document generation or storage media required to accomplish the update feature.

Briefly, the present document storage and retrieval system comprises: storage means having a plurality of storage locations, each storage location having first and second storage areas; filing means for converting the images on a source document to an electronic image signal representative of the images on the source document; means for generating electronic update signals representative of update information for source documents; controller means for logically and selectively directing the image signals to first areas of the storage locations and the update signals to said second areas of said storage locations, the update signals for a particular source document being stored in the same storage location as the image signals therefor; output means for reproducing source documents from the image signals representative thereof; means operatively controlled by the controller means for selectively conducting the image signals stored in any first area of any storage location to the output means; and means operatively controlled by the controller means and responsive to the image signals from the conducting means and the update signals from the storage means for selectively mixing the update signals stored in the second area of the same storage location with the image signals stored in the first area for conduction to the output means whereby the output means reproduces the source documents with or without the update information represented by the update signals therefor.

OBJECTS

It is therefore an object of the present invention to provide a document filing, updating, and retrieval system.

It is a further object of the present invention to provide a document storage and retrievel system where source documents are filed and then updated as part of an active record keeping system.

It is a still further object of the present invention to provide a document filing, updating, and retrievel system wherein documents may be kept current and updated in an active file environment without losing the original or source document during updating.

It is another object of the present invention to provide a document filing, updating, and retrievel system wherein source documents and update information are stored in adjacent areas on a single storage media.

It is still another object of the present invention to provide a document filing, updating, and retrieval system wherein an alpha-numeric overlay may be superimposed on a displayed source document.

Another object of the present invention is the provision of a document filing, updating, and retrieval system wherein either an original document or an updated document may be viewed.

Still other objects, features, and attendant advantages of the present invention will become apparent to those skilled in the art from a reading of the following detailed description of the preferred embodiment constructed in accordance therewith, taken in conjunction with the accompanying drawings wherein:

BRIEF DESCRIPTION OF THE DRAWINGS

FIG. 1 is a block diagram of the present document filing, updating, and retrieval system;

FIG. 2 is a front view of a portion of a piece of a magnetic tape which is used in the system of FIG. 1, illustrating one tape format which may be used; and FIG. 3 is a front view of a piece of magnetic tape, similar to FIG. 2, showing an equivalent tape format which may be used.

DESCRIPTION OF THE PREFERRED EMBODIMENT

Referring now to the drawings and, more particularly, to FIG. 1 thereof, the present document filing, updating, and retrieval system, generally designated 10, includes a filing unit 11 which may consist of a high resolution, television-type, electro-optic scanner for converting the images on source documents into an electronic signal, namely a video signal representative of the images on the source documents. Also included within filing unit 11 would be the associated electronics, a control box assembly, and a platen on which the source document would be placed, together with an associated lighting box. Filing unit 11 is similar to like apparatus described in U.S. Pat. Nos. 3,514,537 and 3,712,956.

System 10 also includes a keyboard unit 12, which would consist of a conventional array of electronic key switch assemblies, similar to a typewriter keyboard, including a group of keys for entering conventional alpha-numeric information and a second group of keys for commanding system operations. Keyboard unit 12 is similar to that apparatus described in U.S. Pat. Nos. 3,618,032, 3,654,611, and 3,810,109. The output of keyboard 12 is directed to a controller 13 which controls all system operations and which creates timing signals for coordinating all functions. Controller 13 is preferably a special-purpose computer, buy may also be a multi-purpose digital computer. Controller 13 receives incoming command signals from keyboard 12, analyzes these commands, and directs the various units of system 10 to perform the directed functions. Controller 13 is similar to like apparatus described in U.S. Pat. Nos. 3,345,458, 3,388,391, 3,514,537, and 3,970,999.

System 10 further includes a storage unit 14 which preferably comprises a magnetic tape transport with associated electronics for recording and playing back video and digital signals on magnetic tape. However, other types of permanent storage medias, such as discs and the like, may be used. Storage unit 14 is similar to that apparatus described in U.S. Pat. Nos. 3,499,976, 3,514,537, and 3,712,956.

As will be explained more fully with regard to FIGS. 2 and 3, the storage media in unit 14 has a plurality of storage locations, each storage location having first and second adjacent storage areas. When a source document is inserted in filing unit 11, controller 13, upon command from keyboard 12, activates filing unit 11, via a line 15, and simultaneously directs storage unit 14, via line 16, to store the resultant video signals appearing on a line 17 in the first area of a selected storage location where the video information defining the source document is retained for subsequent viewing. Therefore, for retrieval of the selected source document, the document may be requested by entering the document number, or some other form of indexing, on keyboard 12 and initiating a retrieve command. Controller 13 then signals storage unit 14, via line 16, to scan the address signals stored on the storage media therein until the desired storage location is found.

The electronic signals defining source documents and located in the first areas of all storage locations will be available from storage unit 14 on a line 18 for conduction to a buffer storage unit 19. Storage unit 19 may be a storage tube similar to like apparatus described in U.S. Pat. Nos. 3,514,537, 3,631,294, and 3,712,956. The output of buffer storage 19 is conducted via a line 20, a mixer 21, and a line 22 to one or more output devices, such as a monitor 23 and/or a printer 24. Mixer 21 is similar to like apparatus described in U.S. Pat. Nos. 3,345,458 and 3,500,336, monitor 23 is similar to that apparatus described in U.S. Pat. Nos. 3,345,458, 3,388,391,, 3,499,976, 3,514,537, and 3,712,956, and printer 24 is similar to like apparatus described in U.S. Pat. Nos. 3,582,863 and 3,679,824. If storage unit 14 is a video tape recorder and if the video information on line 18 were conducted directly to monitor 23, it would appear only for an instant. Thus, buffer storage 19 is utilized to retain the electronic signals defining a source document for continued viewing, buffer storage 19 being a storage tube or other conventional device. In general, buffer storage 19 is utilized to accommodate different reading and writing speeds associated with different types of storage units and different types of output devices. The reading and writing of buffer storage 19 is controlled by signals received thereby over a line 25 from controller 13.

In order to permit active updating of source documents stored in first areas of various storage locations, system 10 includes a buffer storage 27 for storing update information in digital form and a character generator 26 responsive to the output of update storage 27 for generating conventional alpha-numeric information. Update storage 27 which may be identical to buffer storage 19, receives digital signals defining update information and the location thereof from keyboard 12 via controller 13 and a line 28 as such information is entered by the operator on keyboard 12. Upon receiving a suitable command signal from controller 13 over a line 31, these digital signals are continuously and repetitively read out from update storage 27 and conducted via a line 29 to character generator 26. Character generator 26 analyzes the digital signals and generates the appropriate alpha-numeric information, which is conducted via a line 30 to mixer 21. Upon receiving another command signal from controller 13 over line 31, the update information stored in storage 27 is conducted via a line 32 to storage unit 14. Character generator 26 is similar to like apparatus described in U.S. Pat. Nos. 3,345,458, 3,388,391, and 3,500,366.

When an update or change to a source document is required, the operator of system 10 will retrieve the document, as described previously, and enter the location and type of update information on keyboard 12. The digital signals are stored in update storage 27 and simultaneously and continuously read out and conducted to character generator 26. The necessary alpha-numeric information is generated by character generator 26 and is conducted to mixer 21 via line 30 for mixing with the video representation of the particular source document and viewing on monitor 23. In this manner, the identity and location of the update information can be verified as it is entered.

When all of the required update information has been entered and verified on monitor 23, a document upate command may be given to system 10, via keyboard 12, and controller 13 signals update storage 27, via line 31, to transfer the digital signals, via line 32, to storage unit 14. Controller 13 simultaneously signals storage unit 14, via line 16, to store the update information in the second area of the storage location containing the source information in the first area thereof. Furthermore, at any subsequent time, this process may be repeated with additions or deletions being made to the document update information without disturbing the original source document which is stored in a separate area of the storage location.

For subsequent retrieval of the original document, with or without the update information, the document is requested, as described previously, by entering the document number, or some other form of indexing, on keyboard 12 and initiating a retrieve command. The storage media in storage unit 14 is then scanned until the desired storage location describing the document is found, whereupon the video information is transferred, via line 18, to buffer storage 19. Simultaneously, the update information stored in the second area of the same storage location is transferred, via a line 33, back to update storage unit 27, the output of which, as explained previously, may be continuously and repetitively read out and conducted via line 29 to character generator 26. The alpha-numeric information generated by character generator 26 is then conducted, via line 30, to mixer 21 for mixing with the video representation of the particular source document and viewing on monitor 23. Thus, depending upon whether update storage 27 is read out or not, either the original source document or the source document with all update information may be viewed on monitor 23 or printed out by printer 24.

Referring now to FIG. 2, there is shown one format in which source signals and update signals may be recorded on a length of magnetic tape 40. That is, tape 40 includes a plurality of storage locations 41 spaced therealong, each storage location 41 having a first area 42 for storage of a plurality of transversely recorded tracks 44 of video signals representing the original or source document and a second storage area 43 for storage of a plurality of transversely recorded tracks 45 of digital signals representing the update information. The size of both areas 42 and 43 would be fixed for the largest document of information and for the maximum amount of update information required. Smaller documents would still occupy the same area 42 and a limited amount of update information would still occupy the same area 43. While area 43 is shown directly adjacent area 42, it does not have to be necessarily so positioned. Also shown in FIG. 2 are index and control tracks 46 which would be recorded longitudinally on tape 40 and used to locate the document during a retrieval or updating process.

In the embodiment of FIG. 2, the source and update signals are recorded in a transverse mode which is common with video tape recorders. Alternatively, and as shown in FIG. 3, the data tracks 54 and 55 may be recorded longitudinally on a length of tape 50 having a plurality of storage locations 51 spaced therealong, including first areas 52 for storage of source document signals and second areas 53 for storage of update signals.

Summarizing the operation of system 10, documents are entered thereinto by placing them in filing unit 11, entering appropriate index data on keyboard 12, and executing a command to file. Assuming the proper tape is located in storage unit 14, controller 13 will read the entered index data, cause unit 14 to locate the proper storage location 41 on tape 40 and, when tape 40 is in position, the logic of controller 13 will command filing until 11 to scan the document. As the document is being scanned onto one of areas 42 on the moving tape 40 in unit 14, the keyed index data is also being stored on tape 40 along tracks 46. Upon completion of the writing operation, controller 13 will command tape 40 to reposition itself to a base position, such as the center thereof.

Execution of a retrieval consists of entering on keyboard 12 the appropriate index search key words. Upon command of a retrieval, by depressing the proper control key on keyboard 12, and assuming the proper tape is loaded in unit 14, controller 13 will analyze the input index data and cause tape 40 to move in the proper right or left direction. As tape 40 passes under the index read head of unit 14, the stored index data on tracks 46 will be fed to controller 13, via a line 34, where it will be matched against the keyed indexed search words. When a match is found, controller 13 will command unit 14 to read the stored document in the storage area 42 of the selected storage location 41 and transmit the video reproduction of the document to buffer storage 19 to store the image therein. At this time, controller 13 will command buffer storage 19 such that the image written therein is now read out continuously and displayed on monitor 23.

Execution of a print operation is commanded when a document desired for hard copy production is being displayed on monitor 23. Upon executing a print command in keyboard 12, controller 13 will signal printer 24, via a line 35, to cause the stored document in buffer storage 19 to be sent to printer 24 where a hard copy document will be made.

Execution of a document update operation is initiated by first commanding a retrieval of any document, as explained previously. Then, by depression of the appropriate keys in keyboard 12, digital signals representing the desired update information are applied to update storage 27 for storage therein. Upon activation of a simultaneous readout of update storage 27 during the input of information thereto, alpha-numeric characters are generated by character generator 26 and applied to mixer 21 for mixing with the video representation of the particular source document and display on monitor 23. Upon verification that the document update information has been entered correctly in update storage 27, the operator will execute a document update command by depressing the appropriate key on keyboard 12. Controller 13 will cause tape 40 to be positioned in unit 14 in the correct location and, at that time, the update information will be transferred from update storage 27 to the area 43 of the selected storage location 41 in storage unit 14. Upon a subsequent retrieval of the stored data, the stored update information will be transferred to update storage 27 where it is available to be read out and conducted to character generator 26 for generation of alpha-numeric information for simultaneous viewing on monitor 23 or printing by printer 24.

It can therefore be seen that according to the present invention, there is provided a document filing, updating, and retrieval system 10 which solves the problems encountered heretofore in a simple and efficient manner. With system 10, the source documents and the update information are stored on a single storage media. The source document is stored on a fixed field format and the document update information is stored adjacent to it on another fixed field format, both fields occupying well-defined areas of the storage media. The two fixed field formats are adequate to completely define the original document as well as a completely updated document.

The source document may be stored in either analog or digital format and the document update information is stored in digital format. Upon subsequent display of the source document, the document update information is converted to an alpha-numeric overlay. This overlay may be suppressed, at any time, to view the original document in its unaltered state. The entire source document can be covered with update information, thereby giving system 10 virtually unlimited update capability. Furthermore, update information can be added to, altered, or erased without affecting the original document. The original document, too, can be updated to a new source document on an active basis. Because all operations are occurring on the document in question and in well-defined areas of the storage media, there is no additional document generation or storage media required to accomplish the update feature.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

We claim:

1. A document storage and retrieval system for filing and updating source documents comprising:
   storage means having a plurality of storage locations, each storage location having first and second storage areas;
   filing means for converting the images on a source document to an electronic image signal representative of said images on said source document;
   means for generating electronic update signals representative of update information for source documents;
   controller means for logically and selectively directing said image signals to said first areas of said storage locations and said update signals to said second areas of said storage locations, the update signals for a particular source document being stored in the same storage location as the image signal therefor;
   output means for reproducing source documents from the image signals representative thereof;
   means operatively controlled by said controller means for selectively conducting the image signals stored in any said first area of any said storage location to said output means; and
   means operatively controlled by said controller means and responsive to said image signals from said conducting means and said update signals from said storage means for selectively mixing the update signals stored in said second area of the same said storage location with said image signals stored in said first area for conduction to said output means whereby said output means reproduces said source document with out without the update information represented by the update signals therefor.

2. A document storage and retrieval system according to claim 1 wherein said storage means is operative to permit continuous storage and erasure of information therein whereby update signals may be repetitively stored in second areas of selected storage locations to continuously update the source document having its image signals stored in the first area of the same selected storage location.

3. A document storage and retrieval system according to claim 1 wherein said image signals are analog signals and said update signals are digital signals.

4. A document storage and retrieval system according to claim 3 further comprising:
   a character generator responsive to said digital update signals for generating a video signal defining alpha-numeric characters for reproduction by said output means with said source documents.

5. A document storage and retrieval system according to claim 1 wherein said storage means is a magnetic tape recorder, wherein said filing means includes an electro-optic scanner for scanning said source document and for generating video signals, and wherein said update signals generating means generates alphanumeric information in a digital format.

6. A document storage and retrieval system according to claim 5 wherein each storage location consists of a fixed portion of said magnetic recording tape, said first and second areas comprising fixed portions of said tape.

7. A document storage and retrieval system according to claim 1 further comprising:
   first buffer storage means interposed between said storage means and said output means for temporarily storing the image signals from any said first area of any said storage locations, said image signals conducting means conducting said image signals to said buffer storage means and then via said mixing means to said output means.

8. A document storage and retrieval system according to claim 7 further comprising:
second buffer storage means interposed between said electronic update signals generating means and said storage means for temporarily storing said update signals.

9. A document storage and retrieval system according to claim 8 wherein said second buffer storage means may be continuously and repetitively read out during generation of said electronic update signals, said read out update signals being applied via said mixing means to said output means for verification of entered update information.

10. A document storage and retrieval system according to claim 9 wherein said controller means is operative, upon verification of the location of said update signals on said output means, to direct said read out update signals to said second area of the storage location for said source document.

11. A document storage and retrieval system according to claim 9 wherein said update signals are digital signals and further comprising:
a character generator responsive to said read out digital update signals from said second buffer storage means for generating alpha-numeric signals, said alpha-numeric signals being conducted via said mixing means to said output means.

12. A document storage and retrieval system according to claim 9 wherein update signals stored in said second areas of said storage locations are conducted to said second buffer storage means when said image signals stored in said first areas of said storage locations are conducted to said first buffer storage means.

* * * * *